United States Statutory Invention Registration [19]

[11] Reg. Number: H662

Saito et al. [43] Published: Aug. 1, 1989

[54] PROCESS FOR PRODUCING SILVER HALIDE EMULSION IN EQUIPMENT MADE OF STAINLESS STEEL CONTAINING MOLYBDENUM

[75] Inventors: Toshio Saito; Akihiko Kabasawa; Masami Ishikura; Sadayuki Miyazawa; Nobuo Suzuki, all of Tokyo, Japan;

[73] Assignee: Konishiroku Photo Industry Co., Ltd., Japan

[21] Appl. No.: 39,100

[22] Filed: Apr. 16, 1987

[30] Foreign Application Priority Data

Jun. 5, 1986 [JP] Japan ..... 61-130991

[51] Int. Cl.[4] ..... G03C 1/02

[52] U.S. Cl. ..... 430/564; 430/567; 430/627; 430/935; 430/569

[58] Field of Search ..... 430/569

[56] References Cited

U.S. PATENT DOCUMENTS 4,477,564 10/1984 Cellone et al. ..... 430/569 X
4,539,2990 9/1985 Mumaw ..... 430/569

FOREIGN PATENT DOCUMENTS 154437 9/1984 Japan .
225462 5/1986 Japan .

*Primary Examiner*—John F. Terapane
*Assistant Examiner*—Daniel Metzmaier

[57] ABSTRACT

In a process for producing a silver halide emulsion through mixing a halide solution and a silver nitrate solution in the presence of a hydrophilic colloid, the improvement is disclosed wherein any part of the equipment that is employed in the process starting with the initiation of silver halide formation and ending with the coating of the emulsion on a support and with which the reaction solution will come in contact is made of a stainless steel having a molybdenum content of 2.2–5.0 wt %.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

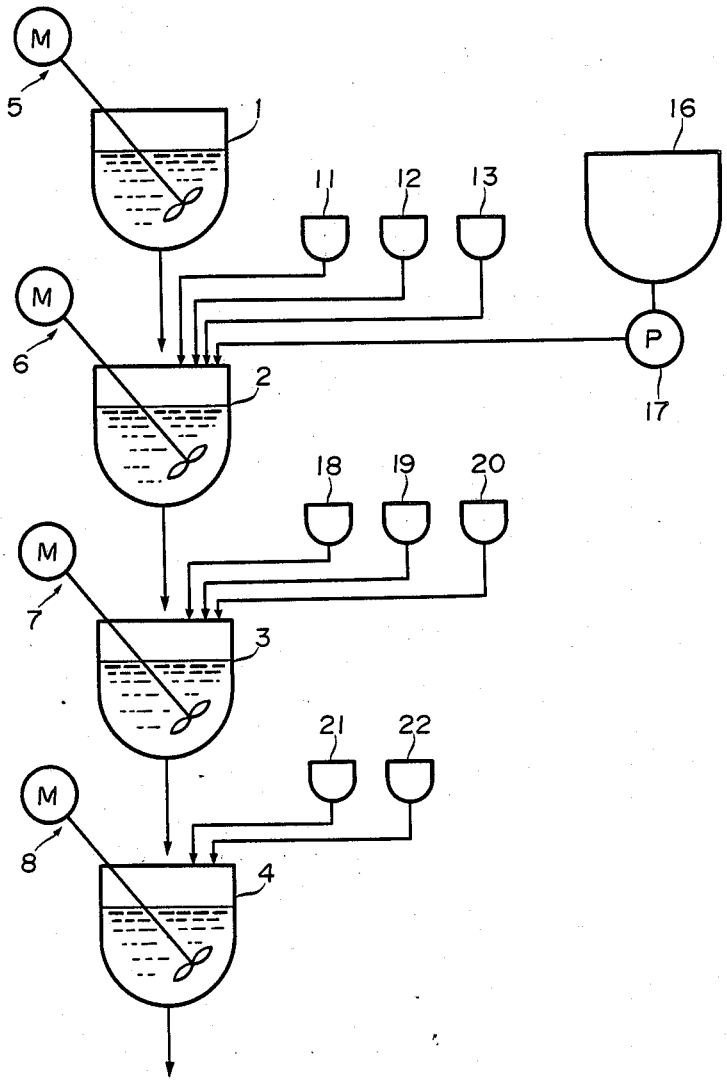
M
5
1
16
11
12
13
M
6
2
P
17
18
19
20
M
7
3
21
22
M
8
4

PROCESS FOR PRODUCING SILVER HALIDE EMULSION IN EQUIPMENT MADE OF STAINLESS STEEL CONTAINING MOLYBDENUM

BACKGROUND OF THE INVENTION

The present invention relates to a process for producing a silver halide emulsion and, in particular, to a process that is capable of mass production of silver halide emulsions having consistently good photographic characteristics and properties.

Photographic silver halide emulsions are formed by mixing halide solutions with a silver nitrate solution in the presence of hydrophilic colloids such as gelatin so that a slightly soluble silver halide formed from halide and silver ions is dispersed in the hydrophilic colloid.

Silver halide emulsions are prepared by a process that typically consists of the following steps in sequence: a physical ripening step in which fine silver halide nuclei are formed and permitted to grow into larger grains; a desalting step which includes the washing out of salts, excess halide ions and other by-products from the silver halide formed in the physical ripening step; a chemical ripening step for increasing the sensitivity of silver halide by, for example, sensitization with a reduction sensitizer, a noble salt sensitizer, a sulfur sensitizer, etc. or spectral sensitization performed in the presence of a sensitizing dye; a conditioning step which includes the addition of a variety of chemicals with a view to improving coating, film and other properties; and a coating step in which the prepared emulsion is coated on a support.

In order to perform these steps on an industrial scale (e.g., 100 liters or more), a variety of apparatus and parts are necessary and they include vessels such as a reactor, agitators, piping, nozzles, transport containers, storage containers, and metering apparatus. All of these apparatus and parts have large dimensions and require large amounts of materials for their construction. In addition, the choice of the material to be used must be based on consideration of its suitability for a specific step, that is, a material having good heat transfer is selected if efficient heat transfer is important, a highly corrosion-resistant material is used in a corrosive environment, or a material having good machinability is used to fabricate a complex structure. Most importantly, none of the materials selected should cause adverse effects on the photographic characteristics (e.g., sensitivity and fog) of the silver halide emulsion to be prepared.

However, no comprehensive and detailed studies have been conducted in order to identify materials that can safely be used to construct all the equipment for emulsion preparation. Unexamined Published Japanese Patent Application No. 154437/1984 discloses a technique for preventing variation in the photographic performance of the silver halide grains being produced in the physical ripening step by using a specific material in that part of the reactor which contacts silver ions, and the material is selected from among those which are electrochemically inert to silver ions, such as Teflon, ceramics, silicon and glass lining. Japanese Patent Application No. 225462/1984 discloses the use of metallic or alloyed zirconium as a technique for preventing variation in the performance of silver halide emulsion. The methods and apparatus shown in these patents are effective in certain applications but before they can be applied to all the equipment for preparation of silver halide emulsions, many problems remain to be solved in terms of construction cost, heat transfer, temperature control, etc.

Corrosion-resistant stainless steels such as SUS 304 and SUS 316 are known to be usable as the constituent materials of commercial equipment for the preparation of silver halide emulsions. These stainless steels are based on iron and contain chromium, nickel and other alloying elements such as molybdenum. Techniques for improving the corrosion resistance of steels by addition of elements such as chromium, nickel and molybdenum are disclosed in various references such as "Handbook of Corrosion Inhibiting Technology", Kagaku-kogyosha, 1972, "Stainless Steel Handbook", Nikkan Kogyo shinbunsha, 1976, and "Introduction to Metal Corrosion and Its Inhibition", Kagaku Dojin, 1973. According to these references, chromium, nickel and molybdenum are able to rapidly passivate steels in which they are added and to retard subsequent dissolution of the steel components.

As mentioned previously, SUS 304 and SUS 316 are generally known to be corrosion-resistant stainless steels but if they are placed in the environment in which silver halide emulsions are produced, their components, such as iron, chromium, nickel and molybdenum, will dissolve into the emulsion in small amounts. Although the dissolution of these components is very small, the ions of heavy metals, i.e, chromium, nickel and molybdenum, cause adverse effects on the silver halide emulsion such as reduced sensitivity and increased fog even if they are only present in amounts at the ppm to ppb level.

SUMMARY OF THE INVENTION

In the course of the extensive studies they had been conducting on the production of silver halide emulsions, the present inventors found that the content of molybdenum in stainless steels is an important factor in relation to the photographic performance of emulsions. The present invention has been accomplished on the basis of this finding.

An object, therefore, of the present invention is to provide a process that is capable of mass production of silver halide emulsions having consistently good photographic characteristics or properties while using a reasonably inexpensive material.

This object of the present invention can be attained by a process for producing a silver halide emulsion through mixing a halide solution and a silver nitrate solution in the presence of a hydrophilic colloid, wherein any part of the equipment that is employed in the process starting with the initiation of silver halide formation and ending with the coating of the emulsion on a support and with which the reaction solution will come into contact is made of a stainless steel having a molybdenum content of 2.2–5.0 wt %.

BRIEF DESCRIPTION OF THE DRAWING

The accompanying drawing illustrates the process of preparing a silver halide emulsion in accordance with one embodiment of the present invention.

DETAILED DESCRIPTION OF THE INVENTION

The most important feature of the present invention is that any part of the equipment used in the manufacture of silver halide emulsions that contacts the reaction solution is made of a stainless steel having a molybdenum content of 2.2–5.0 wt %.

It is well known that addition of molybdenum to stainless steels is effective in improving their resistance to corrosion by non-oxidizing acids, as well as to pitting [see, for example, "Handbook of Corrosion Inhibiting Technology", 1972]. Molybdenum is one of the most effective elements for the purposes of improving the corrosion resistance of stainless steel by reducing its passivation current density (i.e., highly stabilizing its passivation) and of improving its resistance to pitting by rendering its pitting potential less anodic. However, some researchers have reported that the pitting resistance of a stainless steel containing molybdenum decreases at low temperatures. Molybdenum is also effective in improving the resistance of stainless steel to crevice corrosion.

On the other hand, addition of molybdenum potentially causes the alpha-phase to be precipitated upon heating at 650° C. or above, and this leads to lower corrosion resistance [see, for example, H. H. Lihlig, Corro. Sci.: 9 (1969) 353]. Molybdenum oxide ($MoO_3$) has a low melting point (795° C.) and is highly volatile, so that if it is added in amounts of several percent or more, abnormal oxidation may occur to cause appreciable deterioration of the resistance to oxidation at high temperatures. A lot of studies have been conducted to reveal that molybdenum renders austenite steels more susceptible to stress corrosion cracking and this adverse effect of molybdenum is noticeable even if it is present in a trace amount.

As shown above, incorporating an increased amount of molybdenum in stainless steel does not necessarily guarantee an improvement in its resistance to corrosion or pitting. The presence of excess molybdenum is obviously undesirable if it is incorporated in the steel material of the equipment for the preparation of silver halide emulsions since it usually has many welded parts. The level of molybdenum to be used should be determined in consideration of the factors of the environment in which the reaction solution will come into contact with the steel material, such as the halide composition of silver halide, the concentration of Ag ions in the silver halide emulsion, the pH and temperature of the solution. However, only limited studies have been made concerning the correlationship between the molybdenum content and the atmosphere of the individual steps of the process for preparing silver halide emulsions.

At every stage of the process for silver halide emulsion preparation, silver ions originating from silver halides are present in the solution. In addition, noble metal sensitization is effected in the presence of the ions of other noble metals such as gold, rhodium, iridium, palladium and platinum. According to the electromotive series (i.e., ionization series) given in "Handbook of Corrosion Inhibiting Technology", a passivated stainless steel is more anodic than the noble metals mentioned above and will partially dissolve into a solution containing one or more of these metals.

When a silver halide emulsion is charged into a desalting vessel for washing with water, the emulsion first maintains a certain liquid level. Then, a flocculant commonly employed in the photographic industry is charged and the supernatant is discarded, followed by addition of makeup water to effect redispersion of the emulsion. If the liquid level of the resulting dispersion is different from the initial level, a concentration cell is formed as a result of the difference in silver ion concentration between the emulsion that has been adhered to the initial liquid level and the emulsion that has been re-dispersed.

The mechanism by which the concentration cell is formed is described in detail below.

If silver ions and halide ions present in a silver halide emulsion have concentrations of $Ag_o^+$ and $X_o^-$, respectively, and if they are in equilibrium with the precipitate AgX, then the following relationship holds good:

$$[Ag_o^+][X_o^-]=Ksp$$

where Ksp is the solubility product which is constant at a given temperature. The concentrations of silver and halide ions are expressed in molar terms. Taking silver bromide (AgBr) as an example, $Ksp=2.7\times10^{-13}$ at 20° C. Suppose here that a system wherein $Ag_o^+$ ($2.7\times10^{-10}$ moles/L) is in equilibrium with $Br_o^-$ ($1\times10^{-3}$ moles/L) is diluted ten-fold with water. The resulting concentrations of silver and halide ions are assumed to be $Ag_1^+$ and $Br_1^-$, respectively. The product of $Ag_1^+$ and $Br_1^-$ is smaller than the solubility product, so in order to maintain the equilibrium between silver and halide ions, AgBr will come into solution. It should be noted here that dissolution of AgBr will necessarily result in the formation of $Ag^+$ and $Br^-$ in equal amounts. Therefore, if the relationship between the initial concentrations of silver and halide ions is $Ag_o^+ \leqq Bro^-$ as in the case being discussed, dilution with water will inevitably cause a change in the silver ion concentration as $Ag_o^+ < Ag_1^+$. In other words, if water is added to a silver halide emulsion as by washing, the concentration of silver halide ions is changed to form a Ag-ion concentration cell in the emulsion and this cell will cause dissolution of the components of the stainless steel of which the emulsion container is made.

As described above, it is impossible to ensure that dissolution of stainless steel will never occur during the production of silver halide emulsions. Instead, the present invention provides a stainless steel composition having a specified molybdenum content that is suitable for use as the constituent material of equipment for silver halide emulsion preparation and which will cause only negligible effects on the photographic performance of the product emulsion.

No detailed information is available that explains the mechanism by which the constituent material of the equipment for silver halide emulsion preparation affects the photographic performance of the product but presumably the specific form of each ionic species of components dissolving out of the constituent material into the emulsion will play some role in this mechanism and the ease with which such ionic species can be incorporated in silver halide grains in the emulsion will be a critical factor.

The present invention is hereinafter described in detail with reference to the accompanying drawing which shows schematically the process of silver halide emulsion preparation. In the drawing, 1 is a physical ripening vessel, 2 is a desalting vessel, 3 is a chemical sensitization vessel and 4 is an emulsion conditioning vessel. The vessels 1 to 4 are equipped with stirrers 5 to 8, respectively. The desalting vessel 2 is connected to flocculant tanks 11 and 12, a gelatin solution tank 13 and a distilled water tank 16 via pump 17 in such a manner that their respective contents can be charged into the vessel 2 as required. In a similar manner, the chemical sensitizing vessel 3 is connected to chemical sensitizer tanks 18 and 19 and a stabilizer tank 20, and the emulsion conditioning vessel 4 to a thickener tank 21 and a levelling agent tank 22.

In accordance with the present invention, at least the four vessels 1 to 4 and the associated stirrers 5 to 8 are formed of a stainless steel with a molybdenum content of 2.2–5.0 wt % in the area where they will make contact with the liquid contents of the respective apparatus. The stainless steel with a molybdenum content of 2.2–5.0 wt % is hereinafter referred as the stainless steel of the present invention.

The stainless steel of the present invention may be used in the entirety of each of the apparatus mentioned in the preceding paragraph. Alternatively, the stainless steel of the present invention may be used in part of the apparatus such as the lining on the inner wall with which the liquid contents of that apparatus will come in contact. The manner in which the stainless steel of the present invention is used is not limited to any particular case so long as the part of the apparatus which eventually makes contact with the contents is formed of the stainless steel of the present invention.

The process of preparing a silver halide emulsion with the equipment shown in the accompanying drawing will proceed as follows. First, the physical ripening vessel 1 is charged with a halide solution and a silver nitrate solution and silver halide grains are permitted to grow in the presence of gelatin. Subsequently, the resulting emulsion is transferred into the desalting vessel 2 in which silver halide grains are precipitated with the aid of a flocculant supplied from the tank 11. The supernatant is decanted and the residue is re-dispersed under agitation in distilled water supplied from the tank 16. A flocculant and an aqueous solution of gelatin are supplied into the vessel 2 from the tanks 12 and 13, respectively, and re-dispersion of the emulsion is prepared. Thereafter, the emulsion is transferred into the chemical sensitization vessel 3 which is fed with chemical sensitizers from the tanks 18 and 19 and a stabilizer from the tank 20. In the final step, the emulsion is transferred to the conditioning vessel 4 in which the emulsion is adjusted to the desired composition with a thickener and a levelling agent supplied from the tanks 21 and 22, respectively. The so prepared emulsion is mixed with a hardening agent and coated on a support by an appropriate means to make a desired silver halide emulsion layer.

The stainless steel of the present invention contains molybdenum in an amount of 2.2–5.0 wt %. Preferably, this stainless steel contains at least 12 wt % chromium, or a combination of at least 16 wt % chromium and at least 6 wt % nickel, with iron being present as the base metal.

Any silver halides that are conventionally used in silver halide emulsions such as silver bromide, silver iodobromide, silver iodochloride, silver chloroiodobromide, silver chlorobromide and silver chloride can be incorporated in the silver halide emulsion for use in the present invention.

The silver halide grains to be used in the present invention may be prepared by any suitable method such as acid process, neutral process or ammoniacal process. The grains may be allowed to grow in one step, or they may be obtained by growth of seed grains. The method of preparing seed grains may be the same as or different from the one used to achieve their growth.

In preparing a silver halide emulsion, both halide and silver ions may be mixed by simultaneous addition, or either halide or silver ion may be added to a solution containing the other ion. Alternatively, both halide and silver ions may be added either successively or simultaneously into a reactor vessel, with the pH and pAg being controlled in consideration of the critical growth rate of silver halide crystals. By employing this method, silver halide grains that have a regular crystallographic shape and a substantially uniform grain size can be obtained. After their growth, the silver halide grains may be converted to have a desired halide composition.

In the present invention, the silver halide emulsion may optionally be prepared in the presence of a silver halide solvent that is effective in controlling the size, shape, size distribution and growth rate of the silver halide grains being formed.

The silver halide grains to be used in the present invention may have metal ions incorporated inside the grains and/or in the grain surfaces in the course of forming and/or growing the grains by using at least one salt selected from among cadmium salts, zinc salts, lead salts, thallium salts, iridium salts (including complex salts thereof), rhodium salts (including complex salts thereof), and iron salts (including complex salts thereof). Said grains may also be placed in an appropriate reduction atmosphere to have reduction-sensitized specks imparted inside the grains and/or into the grain surfaces.

The silver halide emulsions to be used in the present invention may be removed of unnecessary soluble salts after completion of the growth of the silver halide grains, in which case removal of such salts may be achieved by employing the method described in Research Disclosure No. 17643.

The silver halide grains to be used in the present invention may have a uniform distribution of silver halide composition throughout the interior of the grains, or they may be of the core/shell type with different silver halide compositions on the interior and the surface of the grains.

The silver halide grains to be used in the present invention may be of the surface type where latent images are predominantly formed on the grain surfaces or of the internal type where latent images are formed within the grains.

The silver halide grains to be used in the present invention may have regular crystal shapes such as cubic, octahedral and tetradecahedral forms, or may have anomalous crystal shapes such as spherical and tabular forms. These grains may have any desired values for the ratio of (100) to (111) faces. The grains may have combinations of various crystal forms, or grains having different crystal forms may be used in mixture.

The silver halide emulsions to be used in the present invention may have any pattern of grain size distribution, broad or narrow. Said emulsions may be emulsions having a broad distribution (to be referred to as the polydispersed emulsions), or may be emulsions having a narrow distribution (to be referred to as the monodispersed emulsions, which may be defined as emulsions whose standard deviation of size distribution divided by the average grain size is no more than 0.20; the grain size is expressed as the diameter of a spherical grain and as the diameter of an equivalent circle for the projected area of a non-spherical grain) which may be used either independently or in combination. Polydispersed emulsions may be used in combination with monodispersed emulsions.

The silver halide emulsions to be used in the present invention can be chemically sensitized by an ordinary method, such as sulfur sensitization, selenium sensitization, reduction sensitization, or noble metal sensitization using gold or any other noble metal compound. Such methods may be used each independently or they may be used in combination.

The silver halide emulsions to be used in the present invention may be optically sensitized to a desired range of wavelength by using dyes known as sensitizing dyes in the photographic industry. Sensitizing dyes may be employed either singly or in combination. Supersensitizers which are either dyes incapable of spectral sensitization by themselves or compounds substantially incapable of absorbing visible rays and which are capable of increasing the sensitizing effect of the sensitizing dyes may be incorporated in the photographic emulsions together with the sensitizing dyes.

Compounds that are known as antifoggants or stabilizers in the photographic industry may be incorporated in the silver halide emulsion during or upon completion of chemical ripening and/or after completion of chemical ripening but before coating of the silver halide emulsion for the purpose of preventing fogging during preparation of the light-sensitive material, during its storage or during its photographic processing or for the purpose of stabilizing its photographic performance characteristics.

As the hydrophilic colloid for the silver halide emulsion to be used in the present invention, gelatin is advantageously used, but other hydrophilic colloids such as gelatin derivatives, glaft polymers of gelatin with other polymers, proteins, sugar derivatives, cellulose derivatives, and synthesized hydrophilic high-molecular weight substances such as homo- or copolymers may be used.

The following example is provided for the purpose of further illustrating the present invention but is in no way to be taken as limiting.

EXAMPLE

Silver halide emulsions were prepared with equipment having the layout shown in the accompanying drawing in accordance with the following procedures.

A physical ripening vessel 1 was charged with an aqueous solution of ammoniacal silver nitrate and aqueous solutions of potassium bromide and potassium iodide, which were added by the double-jet method, so as to make a silver iodobromide emulsion containing 3.0 mol % AgI. This emulsion was a monodispersed emulsion of cubic grains that had an average size of 1.20 μm and a coefficient of variation of 6.5%. The emulsion was transferred into a desalting vessel 2 in which the water-soluble salts were removed by a conventional method of flocculation washing. Aqueous solutions of flocculants were held in tanks 11 and 12; an aqueous solution of gelatin was placed in a tank 13; and distilled water held in a tank 16 was supplied into the vessel 2 by means of a pump 17. Flocculation washing was conducted by the following procedures: the aqueous solution of flocculant in the tank 11 was added to the agitated emulsion in the vessel 2 while the latter was held at 40° C.; a stirrer 6 was turned off and the silver halide grains were allowed to precipitate; the supernatant was decanted and the precipitated silver halide grains were redispersed with stirring in distilled water that was supplied from the tank 16; the other aqueous solution of flocculant in the tank 12 was supplied into the tank 2 and a similar sequence of precipitation and redispersal was repeated; and finally, the aqueous solution of gelatin in the tank 13 was fed into the vessel 2 so as to make a dispersion of silver halide grains. As a result of these procedures, the silver ion potential of the emulsion was elevated by 100 mV. Potential measurements were conducted by the method described in Japanese Patent Application (OPI) No. 197534/1982.

In the next step, the emulsion in the vessel 2 was transferred into a chemical sensitization vessel 3 in which it was subjected to gold and sulfur sensitization at an elevated temperature of 55° C. by a routine method. An aqueous solution of gold sensitizer, an aqueous solution of sulfur sensitizer and an aqueous solution of stabilizer were held in tanks 18, 19 and 20, respectively. First, the aqueous solutions of sensitizers were added simultaneously from tanks 18 and 19, and 60 minutes later the aqueous solution of stabilizer was added from tank 20.

After being cooled to 40° C., the emulsion was transferred to a conditioning vessel 4 in which it was mixed with a thickening agent from a tank 21 and a levelling agent from a tank 22.

The so prepared emulsion was mixed with a hardening agent and coated on a subbed polyethylene terephthalate film base to form an emulsion layer having a silver deposit of 50 mg/100 $cm^2$. The coated layer was then dried.

Equipment for emulsion preparation was first assembled with 500 μm thick coatings of polytrifluorochloroethylene (product of Tokyo Silicone Co., Ltd.) being applied to those areas of vessels 1 to 4, stirrers 5 to 8 and tanks 11 to 13, 16 and 18 to 22 with which their respective contents would make contact. As a separate task, vessels 1 to 4 and stirrers 5 to 8 were constructed such that those are as that would be touched by their liquid-contents were made of one of the stainless steels identified in Table 1 with various molybdenum contents. Equipment was then assembled by replacing selected components of the polytrifluorochloroethylene-coated equipment with vessels or stirrers formed of stainless steel specimens as indicated in Table 2.

TABLE 1

| Material | Mo (wt %) | Ni (wt %) | Cr (wt %) |
|---|---|---|---|
| A | 0 | 14 | 18 |
| B | 2.0 | 14 | 18 |
| C | 2.2 | 14 | 18 |
| D | 2.5 | 14 | 18 |
| E | 3.0 | 14 | 18 |
| F | 4.0 | 14 | 18 |
| G | 5.0 | 14 | 18 |
| H | 5.5 | 14 | 18 |
| I | 6.0 | 14 | 18 |

Layers of silver halide emulsions prepared in the various versions of the equipment described above were used in making light-sensitive materials. Sensitometry of each of these materials was conducted by exposure of 3.2 CMS given through an optical wedge for a period of 1/50 seconds. The exposed materials were developed with a CDX developer of Konishiroku Photo Industry Co., Ltd., and their sensitivities were determined in terms of relative values with the value for the control sample taken as 100. The control sample was the light-sensitive material using the emulsion that was prepared with the all polytrifluorochloroethylene-coated equipment.

TABLE 2

| Material | Vessel 1/ stirrer 5 | Vessel 2/ stirrer 6 | Vessel 3/ stirrer 7 | Vessel 4/ stirrer 8 |
|---|---|---|---|---|
| A (outside the scope of the invention) | 60 | 93 | 99 | 99 |
| B (outside the scope of the invention) | 91 | 97 | 95 | 99 |
| C (within the scope of the invention) | 100 | 100 | 100 | 100 |
| D (within the scope of the invention) | 100 | 100 | 100 | 100 |
| E (within the scope of the invention) | 100 | 100 | 100 | 100 |
| F (within the scope of the invention) | 100 | 100 | 100 | 100 |
| G (within the scope of the invention) | 100 | 100 | 100 | 100 |
| H (outside the scope of the invention) | 92 | 92 | 98 | 99 |
| I (outside the scope of the invention) | 74 | 90 | 95 | 99 |

Taking as an example the figure at the point where the column of "vessel 2/stirrer 6" crosses the row of "material D", the value of "relative sensitivity" should be interpreted as follows:

$$\text{relative sensitivity} = \frac{\text{sensitivity of the sample using the emulsion prepared with the equipment which was all coated with polytrifluorochloroethylene except for vessel 2 and stirrer 6 which were made of material D in those areas which would make contact with the liquid contents}}{\text{sensitivity of the sample using the emulsion prepared with the all-polytrifluorochloroethylene coated equipment.}} \times 100$$

As the data in Table 2 shows, the method of the present invention was capable of producing silver halide emulsions without causing any adverse effect on their photographic performance, particularly in terms of sensitivity.

What is claimed is:

1. In a process for producing a silver halide emulsion through mixing a halide solution and a silver nitrate solution in the presence of a hydrophilic colloid, the improvement wherein any part of the equipment that is employed in the process starting with the initiation of silver halide formation and ending with the coating of the emulsion on a support and with which the reaction solution will come in contact is made of a stainless steel having a molybdenum content of 2.2–5.0 wt %.

2. A process for producing a silver halide emulsion according to claim 1, wherein said stainless steel contains other than molybdenum at least 12 wt % of chromium, or at least 16 wt % of chromium and at least 6 wt % of nickel.

* * * * *